A. J. SPARROW,

Assignor, by mesne assignments, to J. A. MILLER, Jr.

Fire Extinguisher.

No. 9,397. Reissued Oct. 5, 1880.

WITNESSES:

Wm. L. Ashe,

M. A. Price.

INVENTOR:

Andrew J. Sparrow, by Joseph A. Miller,

Atty.

UNITED STATES PATENT OFFICE.

ANDREW J. SPARROW, OF POTSDAM, N. Y., ASSIGNOR, BY MESNE ASSIGNMENTS, TO JOSEPH A. MILLER, JR., OF PROVIDENCE, R. I.

FIRE-EXTINGUISHER.

SPECIFICATION forming part of Reissued Letters Patent No. 9,397, dated October 5, 1880.

Original No. 134,107, dated December 17, 1872. Application for reissue filed August 12, 1880.

*To all whom it may concern:*

Be it known that I, ANDREW J. SPARROW, of Potsdam, in the county of St. Lawrence and State of New York, have invented certain new and useful Improvements in Fire-Extinguishers; and I do hereby declare the following to be a full, clear, and exact description of the same, reference being had to the accompanying drawings, forming part of this specification, in which—

Figure 1:
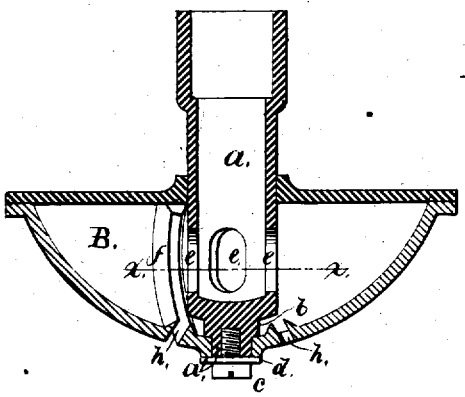
Figure 2:
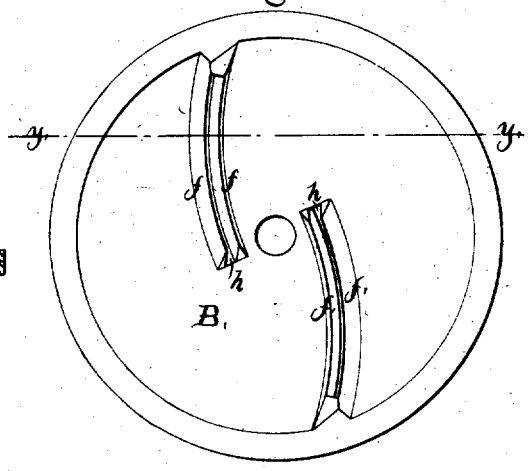
Figure 3:
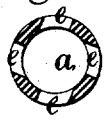
Figure 4:
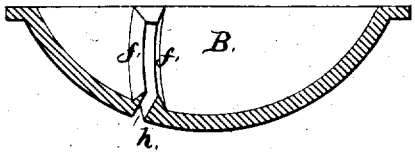
Figure 5:
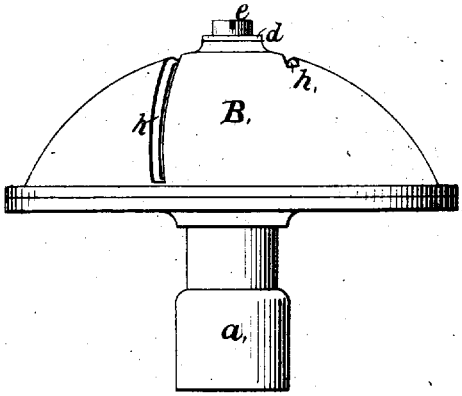

Figure 1 is a sectional view, showing the interior of the revolving head and the tubular stem provided with ports. Fig. 2 is a plan view of the vessel or head, showing the interior of the same. Fig. 3 is a sectional view, through the line *x x*, of the tubular stem, showing the ports for supplying water to the revolving head or vessel. Fig. 4 is a sectional view, through the line *y y*, of the head or vessel, showing the slot through which the water is discharged. Fig. 5 is a perspective view of my improved revolving fire-extinguisher.

Similar letters of reference in the accompanying drawings indicate corresponding parts.

This invention relates to that class of fire-extinguishers in which the water is discharged from a vessel which is made to revolve by the force of the water, and by such revolution throws the water on the fire.

The invention has for its object to improve the construction of such an extinguisher in respect to the means by which the water is discharged into and ejected from the vessel.

To this end the invention consists in the improved construction and arrangement of the parts, which I will now proceed to describe.

In the drawings, B is the vessel aforesaid, the same being in the form of the segment of a sphere, and having a cover suitably attached to it. Through this cover a pipe, *a*, passes centrally, the same being intended to be fastened to any suitable support, and to be the conduit of water from the source of supply to the vessel B. The pipe *a* is contracted at its lower end, and a shoulder, *b*, is formed on its outside, which rests on the bottom of the vessel B, the contracted part *a'* of the pipe passing through said bottom at its center.

The vessel is hung to the pipe by means of a screw, *c*, inserted in the contracted part *a'* from its lower end, the head of the screw supporting a washer, *d*, which forms a true bearing for the bottom of the vessel B. Slots or ports *e* are made in that portion of the pipe *a* which extends within the vessel, through which slots pours the water brought by the pipe, said slots having beveled sides, so as to give the water a direction approximating the tangential. Curved tubes have been heretofore employed for this purpose; but the slots *e* are preferable, as they have a larger area than can conveniently be given to tubes within a vessel of the same size, and consequently discharge a greater quantity of water.

Ribs *f* are formed on the inside of the vessel B, which ribs have slots *h* extending lengthwise of them, which slots extend quite through the vessel and have also a lateral inclination in an opposite direction to the flow of the water from the pipe *a*.

The resistance of the ribs to the water results in the rotation of the vessel B. The water pours out of the vessel through the slots *h*, its deflection, caused by the inclination of said slots, giving increased velocity to the rotation of the vessel. By such rotation the water is thoroughly distributed on all sides of the vessel. With a pressure of thirty-five pounds to the inch this machine will fully flood an area of fifty square feet.

The slots *h h* can be made in the vessel much cheaper than holes could be bored in the same, or nozzles attached, and the discharging water issuing from these slots, owing to the curved form of the vessel, takes a fan-shaped form, spreading the water, and by the revolution of the vessel, due to the reaction of the water, the water is more evenly distributed than when discharged from round holes or nozzles.

Having thus described my invention, I claim as new and desire to secure by Letters Patent—

1. A fire-extinguisher consisting of a vessel provided with a water-inlet and slots through which the water is discharged in sheets, as described.

2. The combination, with a pipe provided with ports, of a revolving vessel provided with elongated outlet-openings arranged obliquely to the surface of the revolving vessel, water being discharged from the pipe directly into the revolving vessel through said ports, substantially as set forth.

3. The combination, with the pipe *a*, provided with the slots or ports *e e*, of a revolving vessel provided with slots made inclined to the surface of the vessel, as described.

4. The combination, with the pipe *a*, provided with ports, of a revolving vessel, B, said ports discharging water from the pipe directly into the revolving vessel, substantially as set forth.

5. The combination, with a revolving vessel provided with slots, of a pipe provided with ports located within said revolving vessel, said ports discharging water from the pipe directly into the revolving vessel, substantially as set forth.

6. The combination, with the pipe *a* and slots or ports *e*, of the vessel B, ribs *f*, and slots *h*, constructed to discharge the water over a large area, as described.

In witness whereof I have hereunto affixed my name.

ANDREW J. SPARROW.

Witnesses:
GEO. Z. ERWIN,
WM. A. DART.